US009454848B2

(12) United States Patent
Mattila (10) Patent No.: US 9,454,848 B2
(45) Date of Patent: Sep. 27, 2016

(54) IMAGE ENHANCEMENT USING A MULTI-DIMENSIONAL MODEL (71) Applicant: Nokia Corporation, Espoo (FI)

(72) Inventor: Ville-Veikko Mattila, Tampere (FI)

(73) Assignee: Nokia Technologies Oy, Espoo (FI)

( * ) Notice: Subject to any disclaimer, the term of this patent is extended or adjusted under 35 U.S.C. 154(b) by 139 days.

(21) Appl. No.: 13/897,571

(22) Filed: May 20, 2013

(65) Prior Publication Data

US 2014/0340394 A1 Nov. 20, 2014

(51) Int. Cl.
G06T 15/00 (2011.01)
G06T 19/00 (2011.01)
G06T 7/00 (2006.01)
G06T 13/80 (2011.01)
G06T 15/20 (2011.01)

(52) U.S. Cl.
CPC ............ *G06T 19/00* (2013.01); *G06T 7/0032* (2013.01); *G06T 13/80* (2013.01); *G06T 15/20* (2013.01)

(58) Field of Classification Search
None
See application file for complete search history.

(56) References Cited

U.S. PATENT DOCUMENTS

| 6,930,715 | B1* | 8/2005 | Mower ......................... 348/239 |
| 2005/0111753 | A1 | 5/2005 | Peleg et al. |
| 2005/0251741 | A1* | 11/2005 | Pilu et al. ..................... 715/520 |
| 2008/0070588 | A1* | 3/2008 | Morin ........................ 455/456.1 |
| 2009/0074238 | A1* | 3/2009 | Pfister et al. .................. 382/100 |
| 2009/0318168 | A1* | 12/2009 | Khosravy et al. .......... 455/456.3 |
| 2010/0303339 | A1* | 12/2010 | Caduff ........................... 382/154 |
| 2010/0306200 | A1* | 12/2010 | Frank et al. ................... 707/741 |
| 2011/0130949 | A1* | 6/2011 | Arrasvuori .................... 701/200 |
| 2011/0256886 | A1* | 10/2011 | Velusamy .................. 455/456.1 |
| 2012/0274625 | A1 | 11/2012 | Lynch |
| 2012/0300984 | A1* | 11/2012 | Dann et al. ................... 382/103 |
| 2013/0321466 | A1* | 12/2013 | Kocienda ..................... 345/635 |

FOREIGN PATENT DOCUMENTS

WO WO2012136388 10/2012

OTHER PUBLICATIONS

Ruigang Yang et al., View-Dependent Textured Splatting, 2006, Center for Visualization and Virtual Environment, Lexington, KY.
Shmuel Peleg et al., Omnistereo: Panoramic Stereo Imaging, Mar. 2001, vol. 23, No. 3, IEEE Transactions on Pattern Analysis and Machine Intelligence.
U.S. Appl. No. 13/897,575, filed May 20, 2013, entitled "Image Enhancement Using a Multi-Dimensional Model".

* cited by examiner

Primary Examiner — Kee M Tung
Assistant Examiner — Yi Wang
(74) Attorney, Agent, or Firm — Lempia Summerfield Katz LLC (57) ABSTRACT A method and apparatus for enhancing an image capture of a geographic area is presented. The enhancement involves receiving an image and aligning a three dimensional model to the received image. A view of the three dimensional model defined by the outline of the received image may be determined. A point of interest in the determined view of the aligned three dimensional model may be identified. A transition may be triggered between the received image to information from the three dimensional model associated with the point of interest.

18 Claims, 9 Drawing Sheets

IMAGE ENHANCEMENT USING A MULTI-DIMENSIONAL MODEL

FIELD

The following disclosure relates to imaging systems and image display related applications, and more specifically to enhancement of two dimensional images using three dimensional models.

BACKGROUND

Mobile device users may attempt to capture an experience by acquiring two dimensional images of the user's experience. These two dimensional image captures may be acquired using a user's mobile device camera and may be stored digitally. To review the user's experiences, the user may view the two dimensional images. Other users may also view the images. However, the two dimensional viewing experience is limited to the two dimensional objects and information captured in the image.

SUMMARY

In an embodiment, a method involves receiving an image. A three dimensional model may then be aligned to the received image. A view of the three dimensional model may be determined as defined by the outline of the received image. A point of interest in the determined view of the aligned three dimensional model may be determined. The method may then involve transitioning from the received image to information from the three dimensional model associated with the point of interest.

In an embodiment, an apparatus may have a memory configured to store an image and a three dimensional model of a geographic area represented by the image. The apparatus may also have a controller configured to align the three dimensional model to the image, wherein the geographic area comprises a point of interest. The controller may also be configure to transition from the image to information associated with the point of interest in the three dimensional model.

In an embodiment, a non-transitory computer readable medium may contain instructions that when executed are operable to receive an image and display the image in an active view. Align the received image to a model. Identify a point of interest in the received image that correlates to a point of interest in the aligned three dimensional model, and transition the active view from a the received image to the point of interest.

BRIEF DESCRIPTION OF THE DRAWINGS

Exemplary embodiments of the present invention are described herein with reference to the following drawings.

DETAILED DESCRIPTION

A user may create a new image or retrieve an existing image. The image may have associated image registration data that indicates when the image was taken, where the image was taken, the direction the camera was facing, and a pose of the camera indicating a camera orientation.

An image may then be positioned or aligned in a multi-dimensional world model, such as is used in Nokia's NAVTEQ True™ product, using the image registration data. A system may use the image registration data to determine a point in the model correlating to the actual location where the camera was located, and the camera's orientation, when an image was taken, thus aligning the image to the multi-dimensional model. The image may then be enhanced using information from the aligned multi-dimensional model.

Information from the three dimensional model used to enhance or augment the image may include information relating to points of interest that are included in the three dimensional model. Information from the model may be presented either in the image associated with an area correlated to a point of interest, or within the model after a transition to the point of interest in the model. This information may include the name of the point of interest, background information, internet articles about the point of interest, a selection of an alternate view, or images of the point of interest. The system may then transition between the image and the point of interest.

Methods and systems are presented for enhancing images using multi-dimensional models. Specifically, embodiments are presented for enhancing captured images with information from models and transitioning from the image based on the model information. The transition may be to the information from the model, to a specific area of the image relating to the information from the model, or a combination of both.

Figure 1:
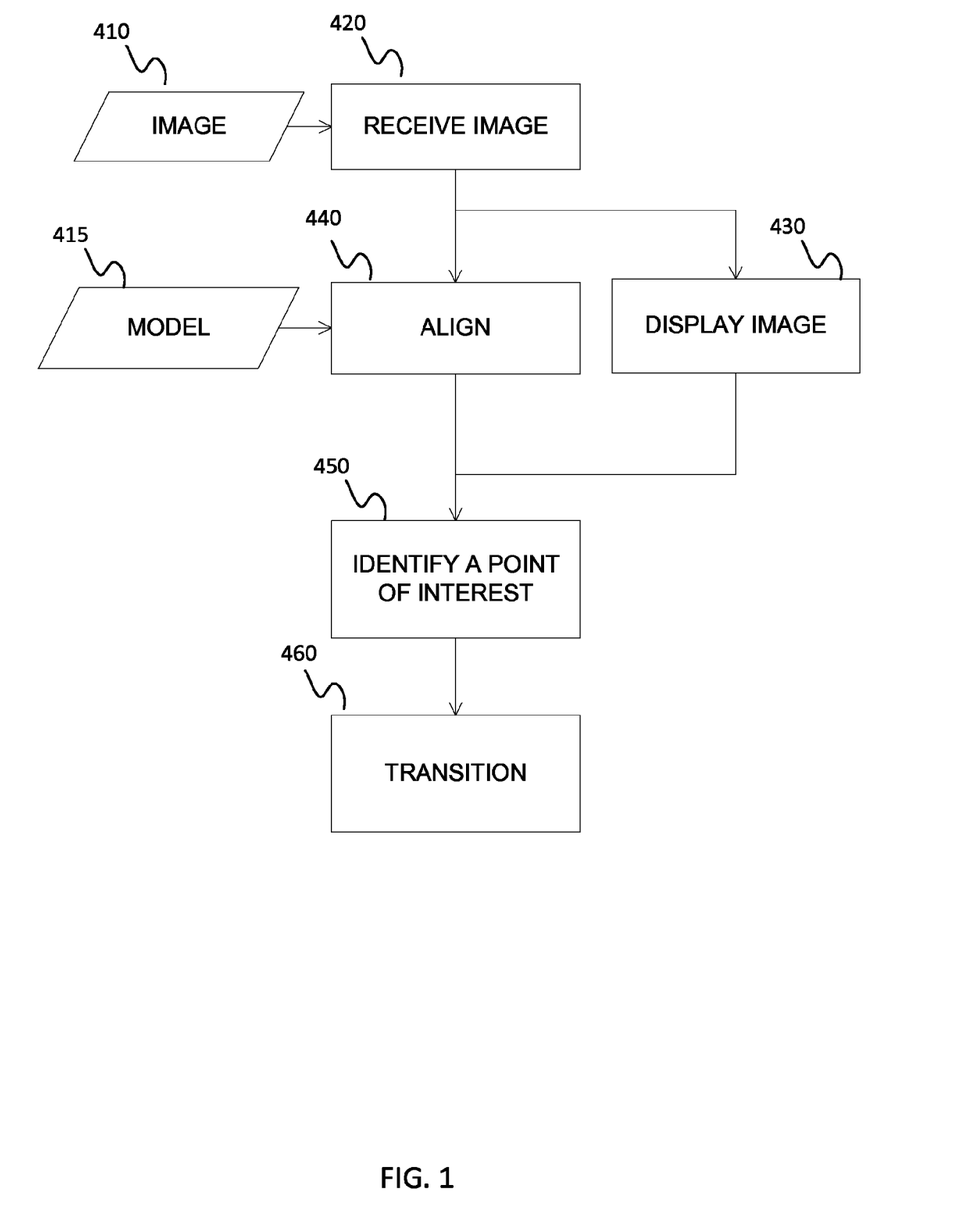
FIG. 1 illustrates an exemplary image enhancement method.

FIG. 1 illustrates an exemplary image enhancement method.

At act 420 an image 410 is received. The image 410 may be a two dimensional digital representation of a geographic area. The image 410 may also have associated data that indicates the location of the device used to capture the representation. The associated data may also include data indicating the direction the device was facing, as well as the orientation of the device at the time the image was captured.

At act 430 the received image 410 is displayed. The received image 410 may be displayed using any viewing or display device, such as a monitor, view-screen, projector, or any other known device capable of displaying an image. The received image 410 may be displayed in a particular view or presentation using any device. The received image 410 may be displayed in an active view on the device.

An active view of the received image 410 may involve a prominent placement of the image in the display of the display device, such as in the center of the viewable area of a display device. An active view of the received image 410 may also involve a presentation of the received image 410 that focuses the attention of a viewer on the received image 410. An active view of the received image may additionally involve a full view of the entirety of the received image 410. Further, an active view of the received image 410 can also include any accent or presentation that distinguishes the received image 410 from other images that may also be displayed on the display device.

At act 440 the received image 410 is aligned to a model 415. The received image 410 may be aligned to the model 415 manually or automatically. The received image 410 may be aligned to the model 415 using the associated data indicating the location, forward facing direction, or orientation of the device used to capture the received image 410. The received image 410 may also be aligned to the model 415 by correlating objects or reference points in the received image 410 and the model 415.

The model 415 may be a three dimensional model. The model may also represent a geographic area. The geographic area may be a rural town, forest, pasture, city, or any other type of geographic area. The model may also be correlated to the actual geographic coordinates of the geographic area represented in the model. The model may contain wire-form models having corner points and forming polygons representing the features and objects in the geographic area. The wire-form models may have images of the geographic area covering the viewable surface of the wire-form models. These images may be aligned to cause the wire-form model to resemble the appearance of the geographic area the model represents. A user may be able to navigate through the model in such a way that mimics real life movement through the geographic area. The model may be manipulated to present multiple orientations or views of the model.

The aligning of act 440 and the image display of act 430 may be performed in any order or at the same time.

In act 450 a point of interest in the received image 410 is identified. The point of interest may correlate to the point of interest as represented in the aligned model 415, and the identification of the point of interest in the received image 410 may be based on the correlation. A correlation may be determined by matching geometry between the received image 410 and the aligned model 415. The point of interest may also be identified as existing in a view in the model 415 that matches the view of the received image 410. The view in the model 415 may be a view of an area of the model representing the geographic area captured by the received image 410. The view in the model 415 may also be bounded by a perimeter defined by the edges of the received image 410.

In act 460 a transition is made from the received image 410 to a point of interest. The transitioned active view may be of the point of interest as represented in the model 415 or of a particular area in the received image 410 identified as containing the point of interest.

A transition may replace the image that is currently in an active view with a different image or view. This replacement may involve placing a different image into a position on the display that is currently occupied by the current active view image. A transition may also involve motion animations or effects to indicate the transition. A transition may involve replacing the active view of a received image 410 with a view of the model 415 that mimics the view of the received image 410. In an embodiment, a transition to the model 415 may also involve an isolated view of a point of an identified point of interest. In such an embodiment, the isolated view of the point of interest may be from a pre-chosen vantage point within the model 415. The embodiment may also present an isolated view of the point of interest in an orientation that is similar to the orientation of the point of interest represented in the received image 410. In another embodiment, the transition is to an isolated view of the area of the received image 410 that represents the identified point of interest. An isolated view of a point of interest may involve blurring all other contents of the image, enlarging the isolated view area to the extents of the original active view image, or highlighting the point of interest in another way such as an illuminated outline or different coloring or lighting effects.

Figure 2:
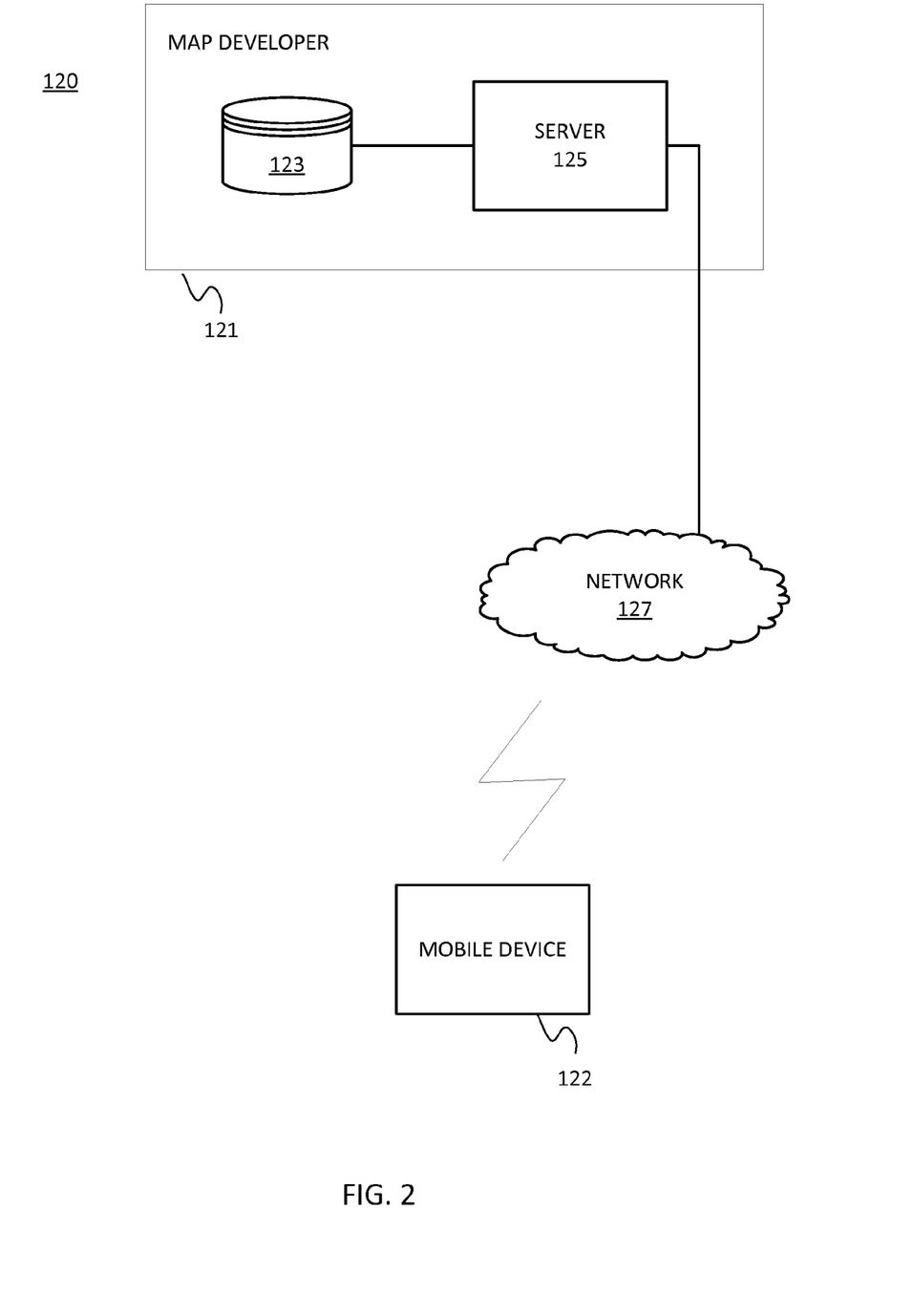
FIG. 2 illustrates an exemplary networked model system for image enhancement.

FIG. 2 illustrates an exemplary networked model and mapping system 120 for image enhancement. The mapping system 120 includes a map developer system 121, a mobile device 122, and a network 127. Additional, different, or fewer components may be provided. For example, many mobile devices 122 may connect with the network 127.

The developer system 121 includes a server 125 and a database 123. The developer system 121 may include computer systems and networks of a system operator such as NAVTEQ or Nokia Corporation. The geographic database 123 may be partially or completely stored in the mobile device 122.

The developer system 121 and the mobile device 122 are coupled with the network 127. The phrase "coupled with" is defined to mean directly connected to or indirectly connected through one or more intermediate components. Such intermediate components may include hardware and/or software-based components.

The database 123 includes geographic data used for mapping and navigation-related applications. The geographic data may include data representing a road network including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may be correlated to a three dimensional model representing a geographic area. The database 123 may also include, or be coupled with, the three dimensional model, as well as points of interest and the geographic locations of points of interest. These points of interest may be correlated to the three dimensional model using the geographic data. Examples of points of interest include gas stations, restaurants, lodging, entertainment and educational opportunities (such as amusement parks, water parks, movie theaters, night spots, museums, and libraries), and historical or other types of landmarks.

The mobile device 122 includes one or more detectors or sensors as a positioning system built or embedded into or within the interior of the mobile device 122. Alternatively, the mobile device 122 uses communications signals for position determination. The mobile device 122 receives location data from the positioning system. The server 125 may receive sensor data configured to describe a position of a mobile device, or a controller of the mobile device 122 may receive the sensor data from the positioning system of the mobile device 122.

The mobile device 122 may communicate location information via the network 127 to the server 125. The location information may also be associated with data captured at the location, such as a digital image. The digital image with associated location information may then be communicated to the server 125 via the network 127. The mobile device 122 may also communicate with the server 125 to transfer three dimensional model data between the mobile device 122 and the server 125.

The computing resources for receiving, aligning, displaying, identifying, and transitioning may be divided between the server 125 and the mobile device 122. In some embodiments, the server 125 performs a majority of the processing. In other embodiments, the mobile device 122 performs a majority of the processing. In addition, the processing is divided substantially evenly between the server 125 and the mobile device 122.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

Figure 3:
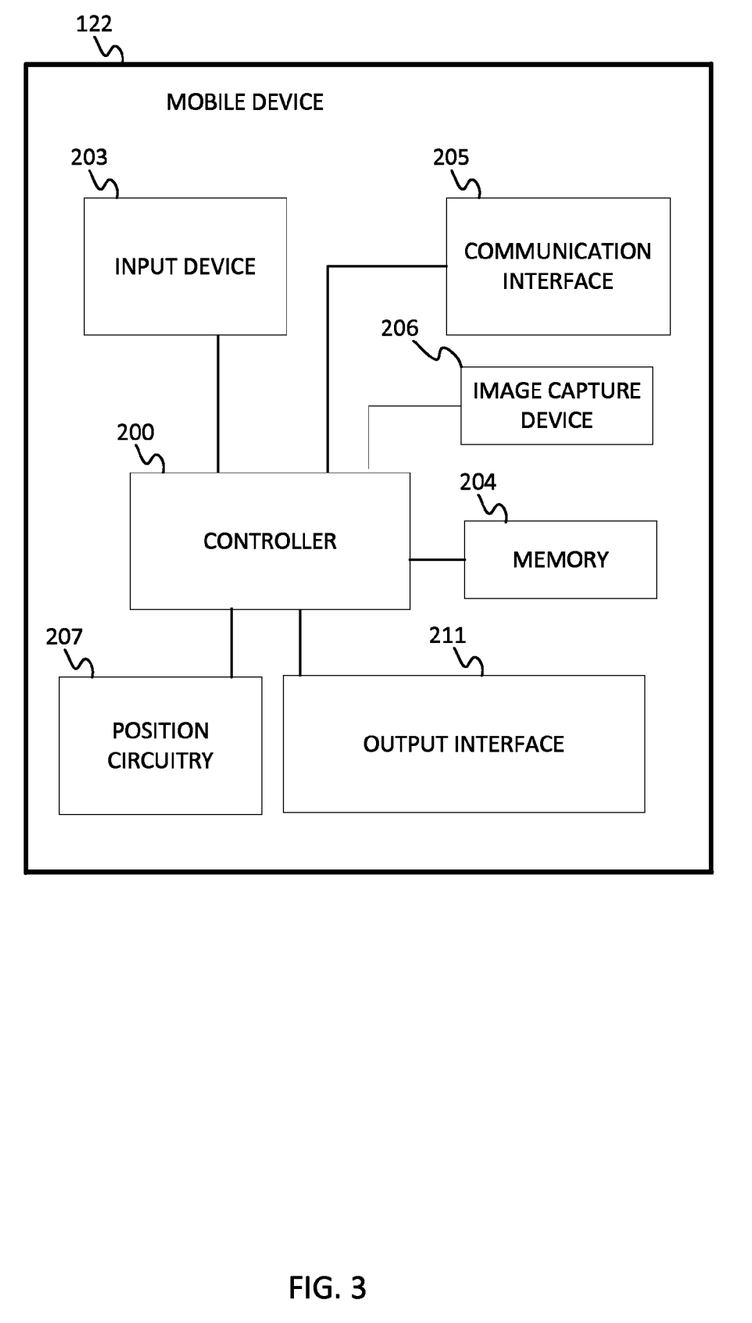
FIG. 3 illustrates an exemplary mobile device for image enhancement.

FIG. 3 illustrates an exemplary mobile device 122 for image enhancement. The mobile device 122 includes a controller 200, a memory 204, an input device 203, a communication interface 205, position circuitry 207, an image capture device 206, and an output interface 211. The output interface 211 may present visual or non-visual information such as audio information. Additional, different, or fewer components are possible for the mobile device 122. The mobile device 122 is a smart phone, a mobile phone, a personal digital assistant (PDA), a tablet computer, a notebook computer, a personal navigation device (PND), a portable navigation device, a camera, and/or any other known or later developed mobile device. The positioning circuitry 207, which is an example of a positioning system, is configured to determine a geographic position of the mobile device 122.

The positioning circuitry 207 may include suitable sensing devices that measure the traveling distance, speed, direction, orientation, and so on, of the mobile device 122. The positioning system may also include a receiver and correlation chip to obtain a GPS signal. Alternatively or additionally, the one or more detectors or sensors may include accelerometers, gyroscopes, and/or magnetic sensors built or embedded into or within the interior of the mobile device 122. The accelerometer is operable to detect, recognize, or measure the rate of change of translational and/or rotational movement of the mobile device 122. The gyroscope is configured to generate data indicative of an angle of orientation of the mobile device 122, with regards to a reference plane or horizon reference. The angle of orientation may be considered a multi-axis tilt measurement. The magnetic sensor, or a compass, is configured to generate data indicative of a heading, or cardinal direction bearing, of the mobile device 122. Data from the accelerometer, the gyroscope, and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

Location data may have spatial and temporal elements. For example, the controller 200 may associate a specific time that a position of mobile device 122 was determined using the position circuitry 207. This specific time may be associated with the determined position and saved as location data in memory 204, or transmitted to server 120. Location data with a temporal element may be considered time stamped.

The input device 203 may be one or more buttons, keypad, keyboard, mouse, stylist pen, trackball, rocker switch, touch pad, voice recognition circuit, or other device or component for inputting data to the mobile device 122. The input device 203 and the output interface 211 may be combined as a touch screen, which may be capacitive or resistive. The output interface 211 may be a liquid crystal display (LCD) panel, light emitting diode (LED) screen, thin film transistor screen, or another type of display. The output interface 211 may also include audio capabilities, or speakers.

The controller 200 may include a general processor, digital signal processor, an application specific integrated circuit (ASIC), field programmable gate array (FPGA), analog circuit, digital circuit, combinations thereof, or other now known or later developed processor. The controller 200 and may be a single device or combinations of devices, such as associated with a network, distributed processing, or cloud computing.

The memory 204 may be a volatile memory or a non-volatile memory. The memory 204 may include one or more of a read only memory (ROM), random access memory (RAM), a flash memory, an electronic erasable program read only memory (EEPROM), or other type of memory. The memory 204 and may be removable from the mobile device 100, such as a secure digital (SD) memory card.

The communication interface 205 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

In an embodiment, the memory 204 is configured to store an image and a three dimensional model of a geographic area represented by the image. The controller 200 is configured to align the three dimensional model to the image. The geographic area may contain a point of interest that would be indicated by data stored with the three dimensional model stored in the memory 204. The controller 200 is also configured to transition from the received image to information stored on the memory 204 that is associated with the point of interest in the three dimensional model. The information associated with the point of interest may also be stored in the memory 204 as a part of the three dimensional model.

In an embodiment, the communication interface 205 may be configured to download an entire three dimensional model, or just a portion of the three dimensional model corresponding to the geographic area captured by the image. The communication interface 205 may also be configured to download the image, upload the image, or download an aligned image and three dimensional model.

In an embodiment, the transition is automatic or triggered after the passage of an amount of time. In another embodiment, there may be multiple points of interest in the geographic area represented by the image. The controller 200 may then be configured to transition between the multiple points of interest. The order in which the controller 200 transitions between the multiple points of interest may be random, based on a pre-assigned hierarchy, or determined based on information stored in memory 204 regarding a user's interests or background. For example, if data is stored in memory 204 indicating that a user is a baseball fan, and the geographic area represented by the image includes Wrigley Field in Chicago, Ill., then the controller may assign Wrigley Field a higher priority, and be transitioned to sooner, than a restaurant that may also exist as a point of interest in the same geographic area represented by the image. The controller 200 may also assign a basic set of priorities based on point of interest categories or point of interest characteristics, where categories and/or characteristics are associated with different priority or hierarchy levels. A user may also be prompted to select a particular point of interest from a list of multiple points of interest to trigger a transition to that point of interest.

In an embodiment, an area of the image may correlate to a point of interest in the geographic area captured by the image. The controller 200 may be configured to modify the image to include an area of interest the correlates to the point of interest. The controller 200 may be further configured to transition to an area of interest when the area of interest in the image is selected. The transition to the area of interest may also occur automatically after a period of time. An embodiment can also include multiple points of interest in the geographic area represented by the image, and multiple correlated areas of interest in the image.

In an embodiment, the mobile device 122 also includes an image capture device 206. The image capture device 206 may be any device operable to record or create durable images by recording light or other electromagnetic radiation. The image capture device 206 may function chemically by means of light-sensitive material such as photographic film, electronically by using an image sensor, or by any other available mechanism for capturing a physical view of objects and the environment the objects are in. The image capture device may be a camera.

In an embodiment, the image capture device 206 captures an image, the controller 200 saves the image digitally with associated image registration information or data, determined from the position circuitry 207, in the memory 204. The image may also be displayed on the output device 211, and communicated to other mobile devices 122, the network 125, or any other device to be stored or displayed, using the communication interface 205.

Figure 4:
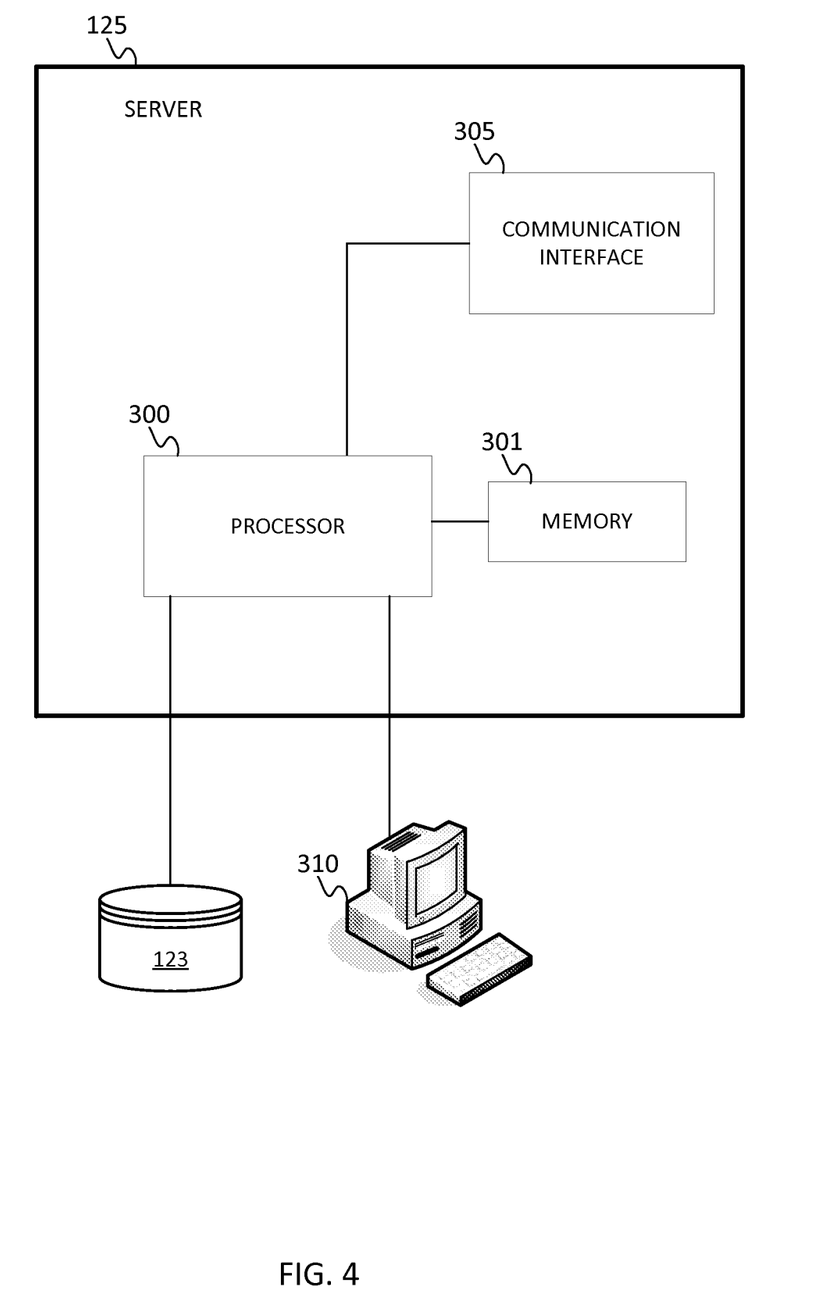
FIG. 4 illustrates an exemplary server for image enhancement.

FIG. 4 illustrates an exemplary server 125 for image enhancement. The server 125 includes a processor 300, a communication interface 305, and a memory 301. The server 125 may be coupled to a database 123 and a workstation 310. The database 123 may be a geographic database. The workstation 310 may be used as an input device for the server 125. In addition, the communication interface 305 is an input device for the server 125. The communication interface 305 receives data indicative of inputs made via the mobile device 122.

The processor 300 may include a general processor, digital signal processor, an application specific integrated circuit (ASIC), field programmable gate array (FPGA), analog circuit, digital circuit, combinations thereof, or other now known or later developed processor. The processor 300 may be a single device or combinations of devices, such as associated with a network, distributed processing, or cloud computing.

The memory 301 may be a volatile memory or a non-volatile memory. The memory 301 may include one or more of a read only memory (ROM), random access memory (RAM), a flash memory, an electronic erasable program read only memory (EEPROM), or other type of memory. The memory 301 may be removable from the mobile device 100, such as a secure digital (SD) memory card.

The communication interface 305 may include any operable connection. An operable connection may be one in which signals, physical communications, and/or logical communications may be sent and/or received. An operable connection may include a physical interface, an electrical interface, and/or a data interface. The communication interface 305 provides for wireless and/or wired communications in any now known or later developed format.

In an embodiment, the memory 301 is configured to store an image, and a model that represents a geographic area captured by an image. This geographic area may include an area of interest, or multiple areas of interest, for a user. The model may be configured to include models and designations of areas of interest within the model. The processor 300 may be configured to align the image to the model. The processor 300 may also be configured to transition from the stored image to information associated with the point of interest in the model. The information may include historical or current information regarding the point of interest. The information may also include pictures or images of the point of interest, as well as a detailed model of the point of interest.

The communication interface 305 is configured to receive an image that captures a view of a geographic area. The communication interface 305 may also be configured to communicate a model of a geographic area to a mobile device 122. The communication interface 305 may also be configured to communicate an image aligned with a model to a mobile device, along with any information associated with the model.

The workstation 310 may contain a display to display the image and/or a model aligned to the image.

In an embodiment, the model is supplemented by the geographic database 123 to associate points of interest from the geographic database 123 with specific locations of the model. The geographic database 123 and the model may be aligned using a common coordinate system. This coordinate system may also be aligned with a corresponding real-world geographic coordinate system.

Figure 5:
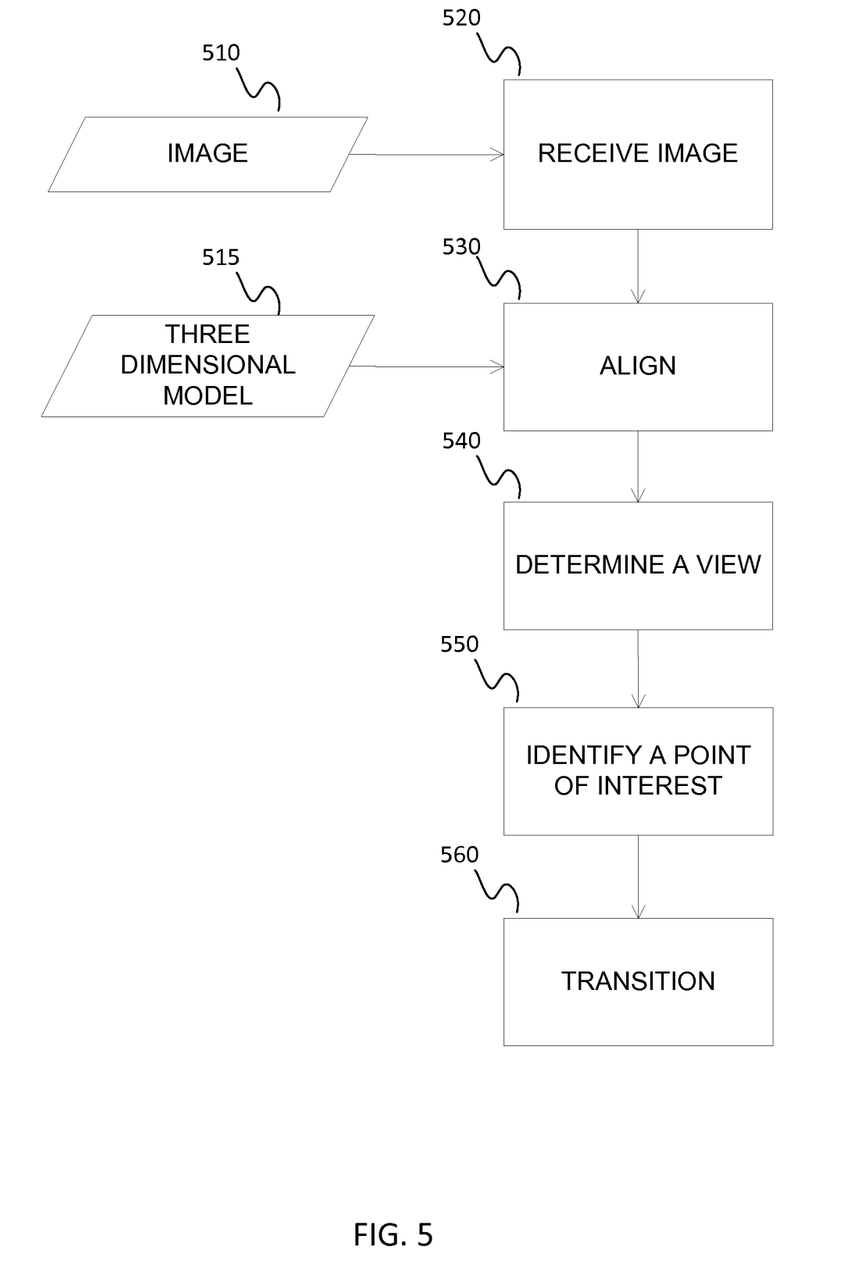
FIG. 5 illustrates an example flowchart for image enhancement.

FIG. 5 illustrates an example flowchart for image enhancement. As presented in the following sections, the term controller may refer to either controller 200 or processor 300 and the following acts may be performed by mobile device 122, server 125, or a combination thereof. Additional, different, or fewer acts may be provided. Mobile data may refer to, image data, location information sent from a mobile unit, other location based data, or other data sent from a mobile unit. The acts are performed in the order shown or other orders. The acts may also be repeated.

At act 520 an image 510 is received. The image 510 may include a captured view of a geographic area. The image 510 may also include associated information or image registration data.

Image associated information or registration data may include geographic data indicating the location of the device that captured the image 510, when the image was captured. As such, this capture location may be indicated through geographical identification metadata, or geotagging data, associated with the image 510. This geotagging data may be in any form. For example, the capture location may be represented as GPS coordinates, or in other formats indicating a latitudinal and longitudinal location. Image associated information may also include information recorded at the time the image 510 was captured, such as angle of tilt of the image capturing device, direction the image capturing device was facing, zoom level of the image capturing device, time and date of capture, or any other information recordable at the time the image was captured.

The image 510 may be received from a camera, or other image generating device. The image 510 may also be received from a network, or other device.

At act 530 the image 510 is aligned to a three dimensional model 515. The three dimensional model 515 may include any representation of a three dimensional surface of an object or a geographic area. The three dimensional model 515 may be oriented to provide two dimensional views of the model. These views may resemble actual images of the object or geographic area. These views may also use actual images of the geographic area the model represents to cover the surfaces of the three dimensional model. Using actual images of geographic features and geographical area can create a very realistic three dimensional model. The three dimensional model 515 may be a solid model, or a shell model. The three dimensional model 515 may be created using polygonal modeling, curve modeling, digital sculpting, or any other method of creating a three dimensional model. The three dimensional model 515 may also represent points of interest in the geographical areas that are represented by the three dimensional model 515.

The image 510 and the three dimensional model 515 may be aligned using any known method. In one embodiment, image associated information is used for alignment. The image associated information may allow for the identification of a point in the three dimensional model that represents the location that the image capture device that captured image 510 was located, when image 510 was captured. The image associated information also may include information indicating what direction the capture device was facing, and at what angle relative to the horizon the capture device was tilted. This information may be used to mimic the precise pose of the capture device.

At act 540 a view of the three dimensional model is determined and defined by the outline of the received image. The capture pose may be used to determine a two dimensional view in the three dimensional model 515 that mimics the view portrayed in the image 510. The boundary of the two dimensional view may be determined using a zoom level recorded in image associated information. The boundary may also be determined by matching pixels or coordinates between the three dimensional model's 515 two dimensional view and the image 510. The boundary may also be determined using a measurement of objects in the image 510 compared to the three dimensional model 515 to determine a perspective or distance from the objects in the image 510.

At act 550 points of interest are identified. The points of interest may be identified as existing in the two dimensional view of the three dimensional model 515. The existence of a point of interest in the two dimensional view may implicate the existence of the point of interest in the image 510.

In an embodiment, an area of interest in the image 510 may be correlated to the point of interest. The image 510 may be modified to include the area of interest either temporarily or permanently. The area of interest may correspond to an outline of the point of interest represented in the image, or may be an area determined to surround the point of interest. An area of interest may be set off or distinguishable from the other areas of the image 510. For example, the area of interest may be bounded by a visual border, such as a colored line, that borders the area of interest. Other methods of distinguishing the area of interest may also be used, such as different lighting, resolution, color effects, or any other effect that may distinguish the area of interest.

Multiple points of interest may also be identified as existing in the two dimensional view of the three dimensional model 515. Also, a user may select categories of points of interest to be identified. For example, a user may indicate that only points of interest with historical or cultural significance be selected. The categories of points of interest identified may also be limited based on associated interests of a user. For example, if a user is associated with an interest area, such as art, categories including statues and architectural significance may be identified.

At act 560 a transition occurs between the image 510 and the point of interest identified in act 550. The transition may automatically occur after a period of time. The transition may also be triggered by something else, such as selecting a point of interest from a list, or selecting an area of interest in the image 510 that correlates or aligns with the point of interest.

The transition may be to information from the three dimensional model 515 associated with the point of interest. This information may include images of or relating to the point of interest. The images may be images derived from the three dimensional model from one or various views or perspectives. Such a view may be determined using image information from the image 510. Information from the three dimensional model may also include audio or video information, such as a voice recording or rendition relaying information, or a video of an important event related to a point of interest 515.

Image information including date and time may also be correlated to seasonal or daylight characteristic data to indicate how or what images derived from the three dimensional model 515 may be transitioned to. For example, if the image information indicates that the image 510 was captured during the winter, the information from the three dimensional model 515 may be a view of the point of interest, presented with snow covering all or parts of the point of interest. Similarly, if the image data indicates that the image 515 was captured at night, the point of interest may be presented with appropriate night lighting characteristics. Also, if the information from the three dimensional model involves alternate image captures of the point of interest, an alternate capture may be chosen to appropriately match the time and date data. Other information such as hours of operation, or significant events as they relate to the date or time of the image 510 capture, may also be correlated and transitioned to using the image information.

Images from the three dimensional model may also include other images of the point of interest, originating external from the three dimensional model 515, but associated with locations identified with the point of interest in the three dimensional model 515. The information may also include information about the three dimensional model such as a name of the point of interest, hours of operation of the point of interest, background information relating to the point of interest, or any other information relating to the point of interest. For example, if a point of interest is determined to be a restaurant, the hours of operation, menu items, or user reviews may be presented as information associated with the point of interest.

The information relating to a point of interest transitioned to may be the point of interest as represented in the three dimensional model 515. The point of interest transitioned to may also be a particular view of the three dimensional model 515, represented as a two dimensional image derived from the three dimensional model 515. The point of interest in the three dimensional model 515 may also be presented from a pre-selected viewpoint of the point of interest. The point of interest may also be presented as an animation involving the point of interest as displayed in the three dimensional model 515. The point of interest transitioned to may also be the area of interest of the image 510. The area of interest may be augmented with information from the three dimensional model 515 related to the point of interest, before, during, or after the transition.

The transition may involve moving the point of interest to the center of the display device, from the position of the point of interest in the image 510. The image may also involve enlarging the point of interest but maintaining an anchored center point in the image 510. The transition may also involve filling the extents of the viewable display area with the point of interest.

The transition may involve motion or animation effects to signify the transition. These effects may include blurring to give the impression of motion, sliding a window of the display to a focal point, enlarging an area of interest, or any other transition effect.

The transition may involve transitioning back to a full or manipulated view of the image 510 after transitioning to the point of interest. This transition may occur automatically after a period of time, or may be triggered by a user.

When multiple points of interest are identified in image 510, transitions may occur between the multiple points of interest. The transitions may involve transitioning back to the original image between transitions to points of interest, or transitioning directly between the multiple points of interest.

The order of transitioning between multiple points of interest may be random, determined by a user selection, or based on a point of interest hierarchy or ranking. The hierarchy may be determined using any method. The hierarchy may be determined using selected preferences of a user or determined tastes of a user. The hierarchy may also be determined based on a defined model hierarchy. A model hierarchy may be predefined to promote certain categories of points of interest, such as restaurants, landmarks, tourist interest areas, or any applicable category.

Figure 6:
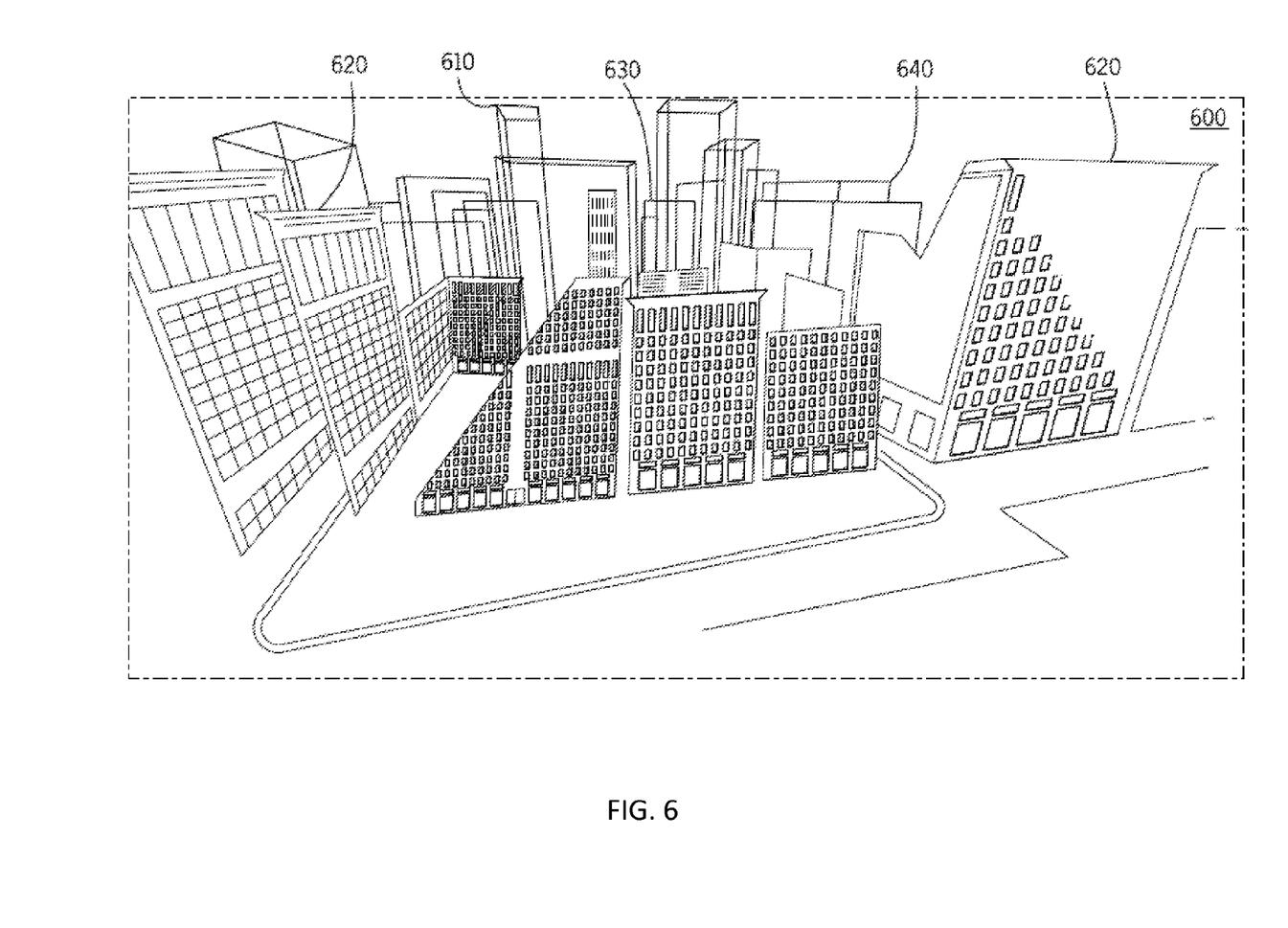
FIG. 6 is an example image representing a view of a three dimensional model of a geographic area.

FIG. 6 is an image representing a view of a three dimensional model 600 of a geographic area. The three dimensional model 600 has been partially deconstructed in this view to display the elements and assembly of the three dimensional model 600. The three dimensional model 600 is composed of wire-form models 610 of buildings, structures, and other objects included in the geographic area. The wire-form models 610 include polygon structures 630 and corner points 640. The polygon structures 630 may be fitted with masks 620 of the real world structure the polygon structures 630 represent. The masks 620 may be actual image captures of the represented structure, computer generated texture maps, or other surface covering image effects.

The three dimensional model 600 may be rotated, translated, and otherwise manipulated to mimic almost any real world view of the geographic area represented, from any perspective or vantage point. The masks 620 may be fitted to all sides of the polygon structures 630 such that as the three dimensional model 600 is rotated, translated, or otherwise manipulated, the masks 620 maintain full visible coverage of the polygon structures 630. The masks 620 therefore enable the three dimensional model 600 to be oriented in any perspective to mimic specific views based on captured images of a geographic area. Two dimensional images of the three dimensional model 600 can be generated from the mimicked views. Portions of the three dimensional model 600 may also be partitioned to allow isolated viewing of specific buildings or points of interest, without the visual impediment provided by adjacent or proximate polygon structures 630 or other model portions.

Figure 7:
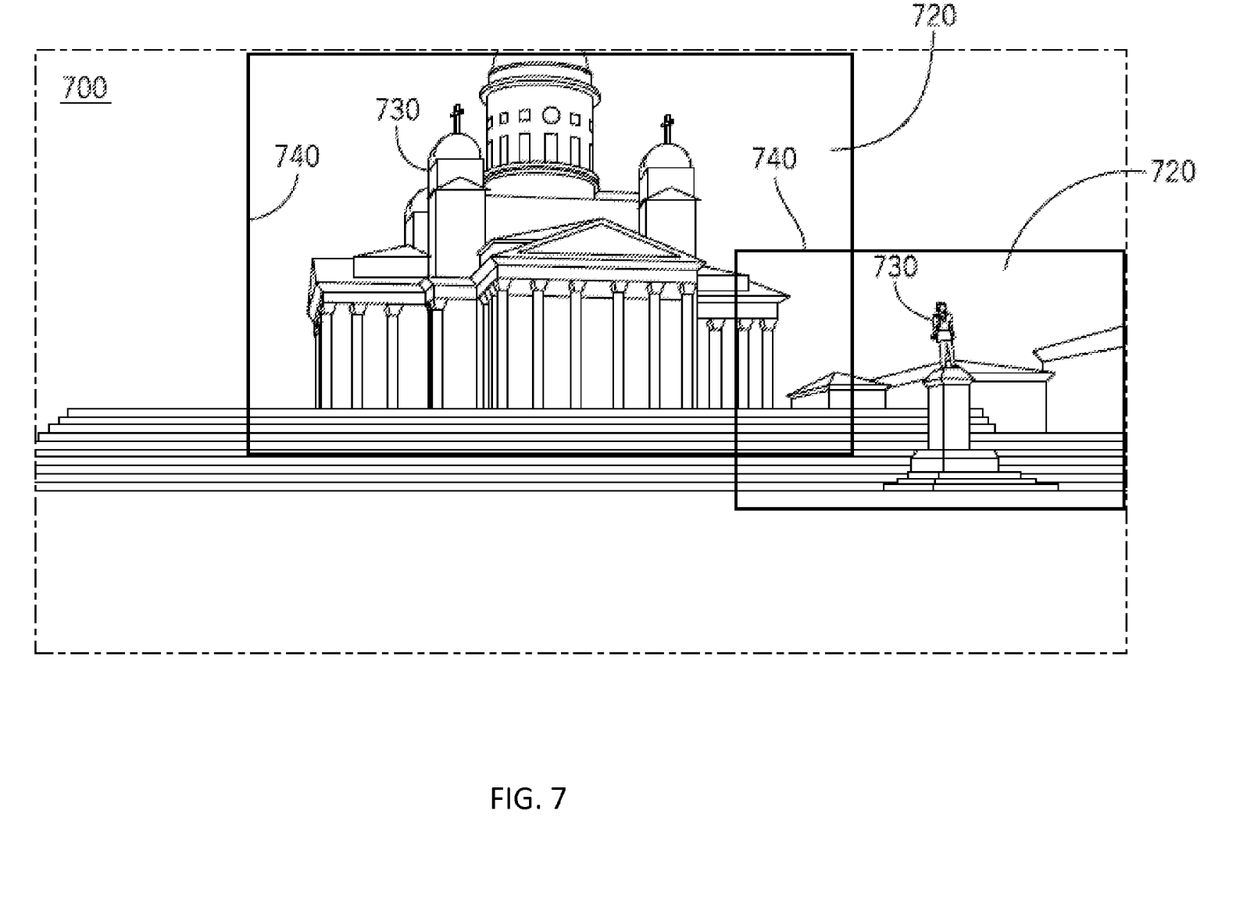
FIG. 7 is an example enhanced captured image.

FIG. 7 is an enhanced captured image 700. Image 700 has been aligned to a three dimensional model and points of interest 730 have been identified. The image 700 has been modified to include areas of interest 720 correlated to the points of interest 730. Areas of interest 720 have been highlighted using lines to define the perimeter 740 of the area of interest.

Figure 8:
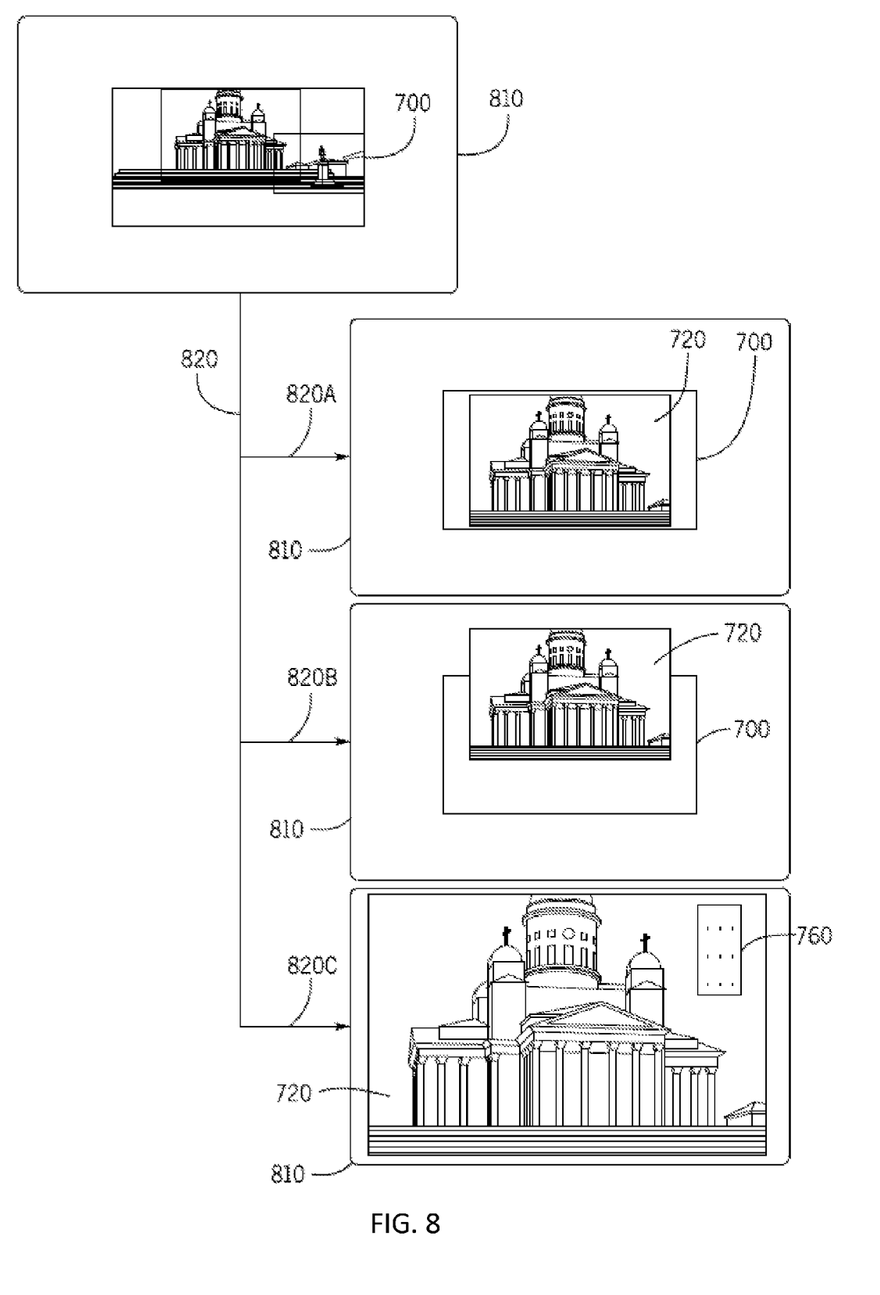
FIG. 8 illustrates example images and points of interests displayed within the viewable area of a display device before and after transitions to points of interest.

FIG. 8 illustrates images and points of interests displayed within the viewable area 810 of a display device before and after transitions to points of interest. Image 700 is centered in the viewable area 810. After a transition 820, information related to the identified point of interest is displayed more prominently in the viewable area 810. The point of interest may be displayed in any fashion so as to distinguish the point of interest from the image 700. Also, the image 700 may be displayed differently after a transition 820 to differentiate the image from the point of interest. For example, the image 700 may be presented out of focus, blurred, or with dimmer lighting effects after a transition 820. Transitions 820 may also occur between multiple points of interest.

In an embodiment, after a transition 820A, information relating to a point of interest is displayed as an area of interest 720 in the center of the viewable area 810, enlarged so as to bring focus to the area of interest 720, and obstruct a significant portion of an image 700. The image 700 may be blurred, or otherwise also distinguished from the area of interest 720.

In an embodiment, after a transition 820B, an area of interest 720 is shown centered over the center of the original position of the area of interest in image 700. The area of interest 720 is enlarged so as to show more detail of the area represented, to distinguish the area of interest 720 from the image 700, and to shift the visual focus of a user to the area of interest 720.

In an embodiment, after a transition 820C, the area of interest 720 is displayed enlarged so as to fill the majority of the viewable area 810. Included in the display of the area of interest 720 is information 760 from the three dimensional model relating to the correlated point of interest. The information may be any information relating to the correlated or identified point of interest. For example, the information may include historical information indicating important dates in the history of the point of interest, as well as practical information relating to tour schedules and costs for the point of interest.

The information 760 may also relate to other points of interest associated with the point of interest correlated with the area of interest 720. The other points of interest may be presented as a list, or group of images, that may be selected by a user. This user selection may trigger a transition to the selected point of interest. The information 760 may also include different images and perspectives from the three dimensional model that relate to the correlated point of interest. A user may also select these images or perspectives to trigger a transition. In an embodiment, a user may select an option to transition to the three dimensional model, in an environment that may allow translational and rotational manipulation of the three dimensional model, or specifically the representation of the point of interest in the three dimensional model.

Transitions 820 between presentations of images 700 and points of interest may be performed using any transition method. For example, the area of interest 720 may appear to grow during a transition 820A, grow and move during a transition 820B, appear suddenly in a different form, window, or size during a transition 820C. The translation may have an associated sound that signifies the transition. Any other form of transition including animations or other effects may be used.

Figure 9:
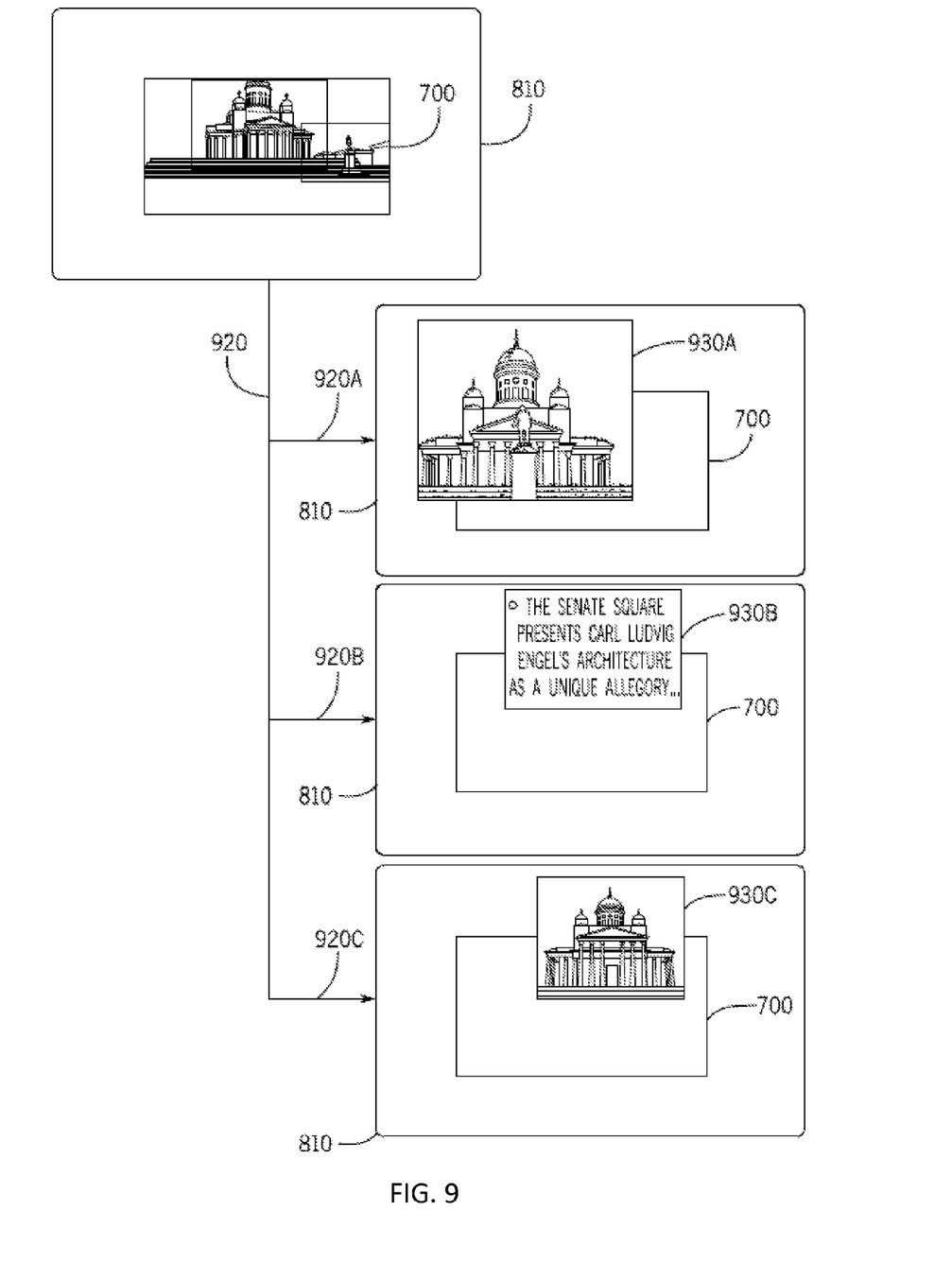
FIG. 9 illustrates example images and points of interests displayed within the viewable area of a display device before and after transitions to points of interest.

FIG. 9 illustrates images and points of interests displayed within the viewable area 810 of a display device before and after transitions 920 to points of interest. The information associated with the point of interest presented may include an alternate image capture 930A of the point of interest, textual or other information 930B relating to the point of interest, or a two dimensional view 930C of three dimensional model of the point of interest. The information relating to the point of interest may also be any other information, such as a transition 920 to an animation of the point of interest created from the three dimensional model of the point of interest.

In an embodiment, after transition 920A, and alternate image capture 930A is displayed prominently in the viewing area 810. The alternate image capture 930A may be a capture associated with a time of year, such as winter, that may be indicated by the image information associated with an image 700.

In an embodiment, after transition 920, textual information 930B relating to the point of interest may be presented prominently in the viewing area 810. The textual information 930B may present historical or current facts relating to the point of interest.

In an embodiment, after transition 920C, a two dimensional view 930C of three dimensional model of the point of interest may be presented prominently within the viewable area 810. The two dimensional view 930C may be taken from any orientation, and may be taken from an orientation similar to the view presented of the point of interest in the image 700. The two dimensional view 930C may also be presented with various lighting effects. For example, information associated with the image 700 may indicate that the image was captured at night, and the lighting effects may then allow the two dimensional view 930C to represent a night-time image.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method of image enhancement, the method comprising:
   receiving an image captured by a camera, wherein the received image comprises registration information;
   displaying the image;
   aligning, with a processor, a three dimensional model to the received image, wherein the aligning comprises using the registration information to correlate a point in the model to an actual location where the camera was located when the image was captured;
   identifying a plurality of points of interest in the received image based on correlating the points of interest from the aligned three dimensional model to the received image;
   transitioning from displaying the received image to displaying textual information regarding one of the points of interest from the three dimensional model associated with the one of the points of interest; and
   transitioning between displaying each of the plurality of points of interest from the image in an order based on a point of interest hierarchy.

2. The method of claim 1, wherein the transitioning is triggered automatically after a period of time.

3. The method of claim 1, further comprising:
   modifying the received image to include an area of interest that correlates to the point of interest.

4. The method of claim 1, wherein the textual information regarding the point of interest from the three dimensional model comprises a name of the point of interest, hours of operation of the point of interest, or background information relating to the point of interest.

5. The method of claim 1, wherein the correlating is determined by matching geometry between the received image and the three dimensional model.

6. The method of claim 1, wherein the points of interest are identified as existing in a two dimensional view of the three dimensional model, and existence of the points of interest in the two dimensional view implicate existence of the points of interest in the received image.

7. The method of claim 1, wherein the received image comprises geographic data indicating the location of a device that captured the received image, wherein the points of interest are identified using the geographic data.

8. The method of claim 1, wherein the transitioning comprises transitioning away from prominently displaying the received image to prominently displaying the textual information regarding one of the points of interest from the three dimensional model associated with the corresponding point of interest in a viewing area.

9. The method of claim 8, wherein after the transitioning, the textual information fills a majority of the viewing area.

10. An apparatus comprising:
    a memory configured to store a captured image and a three dimensional model of a geographic area represented by the image;
    position circuitry configured to determine position information; and
    a controller configured to:
       align the three dimensional model to the image, wherein the geographic area comprises a point of interest, wherein the controller is further configured to associate the position information with the image as registration information, and the registration information is used to align the three dimensional model to the image, and
       transition away from displaying the image to displaying textual information regarding the point of interest from the three dimensional model, wherein there are a plurality of points of interest in the geographic area, and the controller is further configured to transition between displaying each of the plurality of points of interest from the image in an order based on a point of interest hierarchy.

11. The apparatus of claim 10, further comprising:
    an image capture device configured to capture and generate the image from a physical view of the geographic area.

12. The apparatus of claim 10, wherein the controller is further configured to:
    modify the image to include an area of interest that correlates to the point of interest.

13. The apparatus of claim 10, wherein the transitioning is triggered by selecting the area of interest.

14. The apparatus of claim 10, further comprising:
    a communication interface configured to download at least a portion of the three dimensional model corresponding to the geographic area.

15. A non-transitory computer readable medium including instructions that when executed by a processor are operable to:
    receive an image captured by a camera of a mobile device, wherein the received image comprises registration information;
    align the received image to a model, wherein the aligning comprises using the registration information to correlate a point in the model to an actual location where the camera was located when the image was captured;
    display the received image in an active view;

identify, based on the model, a plurality of points of interest in the received image that correlate to the plurality of points of interest as represented in the model; and transition the active view from the received image between the plurality of points of interest and textual information regarding the points of interest from the three dimensional model in an order based on a point of interest hierarchy.

16. The non-transitory computer readable medium of claim 15, wherein the transitioning is automatic.

17. The non-transitory computer readable medium of claim 15, wherein the non-transitory computer readable medium is a memory of a mobile device.

18. The non-transitory computer readable medium of claim 17, wherein the instructions are further operable to cause the processor to:

capture the received image as two dimensional visual data representing a physical view of a geographic area.

* * * * *